United States Patent
Takeshima et al.

(10) Patent No.: US 9,485,166 B2
(45) Date of Patent: Nov. 1, 2016

(54) NETWORK ABNORMALITY DETECTION SYSTEM, MEASUREMENT APPARATUS, AND ANALYSIS APPARATUS

(71) Applicant: HITACHI, LTD., Tokyo (JP)

(72) Inventors: Yoshiteru Takeshima, Tokyo (JP); Osamu Namiki, Tokyo (JP); Yukio Ogawa, Tokyo (JP); Yukiko Takeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 14/077,481

(22) Filed: Nov. 12, 2013

(65) Prior Publication Data

US 2014/0136694 A1 May 15, 2014

(30) Foreign Application Priority Data

Nov. 15, 2012 (JP) ................................. 2012-250799

(51) Int. Cl.
*H04L 12/26* (2006.01)
*H04L 12/24* (2006.01)
*G06F 15/173* (2006.01)

(52) U.S. Cl.
CPC ............ *H04L 43/12* (2013.01); *H04L 41/064* (2013.01); *H04L 43/026* (2013.01); *H04L 12/2602* (2013.01)

(58) Field of Classification Search
CPC ... H04L 43/12; H04L 43/026; H04L 41/064; H04L 12/2602
USPC .................................. 709/224, 230; 370/242
See application file for complete search history.

(56) References Cited

U.S. PATENT DOCUMENTS

| | | | | |
|---|---|---|---|---|
| 8,621,615 | B2 * | 12/2013 | Zhao | H04L 12/2602 370/252 |
| 2002/0107953 | A1 * | 8/2002 | Ontiveros | H04L 43/06 709/224 |
| 2006/0047807 | A1 * | 3/2006 | Magnaghi | H04L 63/1458 709/224 |
| 2006/0230167 | A1 * | 10/2006 | Watanabe | H04L 12/2602 709/230 |
| 2010/0205483 | A1 | 8/2010 | Ishiou | |
| 2010/0290346 | A1 * | 11/2010 | Barford | H04L 41/064 370/242 |

FOREIGN PATENT DOCUMENTS

| | | |
|---|---|---|
| JP | 2005-285040 A | 10/2005 |
| JP | 2010-186310 A | 8/2010 |

* cited by examiner

*Primary Examiner* — David Lazaro
*Assistant Examiner* — Zi Ye
(74) *Attorney, Agent, or Firm* — Mattingly & Malur, PC

(57) ABSTRACT

In a communication system in which a plurality of communication apparatuses perform communication via a communication network, a network abnormality detection system dynamically creates a monitoring rule during operation without defining information (monitoring rule) regarding communication to be monitored in advance and perform a collection process and an abnormality determination process quickly even when an amount of information to be monitored is vast. The network abnormality detection system copies packets transmitted at predetermined measurement positions in the communication network, calculates communication statistics information at each measurement position from the copied packets, analyzes one or more pieces of communication statistics information, and detects occurrence of communication abnormality.

8 Claims, 17 Drawing Sheets

FIG. 2

PACKET COUNTER TABLE 4150

| | 0 | 1 | 2 | 3 | |
|---|---|---|---|---|---|
| ENTRY NUMBER (4151) | 0 | 1 | 2 | 3 | ... |
| TRANSMISSION SOURCE IP ADDRESS (4152) | 192.168.123.34 | 192.168.126.173 | 192.168.213.145 | 192.168.215.101 | ... |
| DESTINATION IP ADDRESS (4153) | 192.168.5.23 | 192.168.5.24 | 192.168.5.23 | 192.168.5.24 | ... |
| TYPE OF PROTOCOL (4154) | TCP | TCP | TCP | TCP | ... |
| TRANSMISSION SOURCE PORT NUMBER (4155) | 49152 | 1024 | 49154 | 1027 | ... |
| DESTINATION PORT NUMBER (4156) | 8080 | 80 | 8080 | 80 | ... |
| NUMBER OF RECEIVED PACKETS (4157) | ... | ... | ... | ... | ... |
| NUMBER OF DISCARDED PACKETS (4158) | ... | ... | ... | ... | ... |
| NUMBER OF RECEIVED BYTES (4159) | ... | ... | ... | ... | ... |

FIG. 3A

COUNTER TABLE OF EACH IP ADDRESS

4161

| ENTRY NUMBER | 0 | 1 | 2 | ... |
|---|---|---|---|---|
| IP ADDRESS | 192.168.5.23 | 192.168.5.24 | 192.168.5.34 | ... |
| COUNTER | ... | ... | ... | ... |

COUNTER TABLE OF EACH PORT NUMBER

4162

| | | | | |
|---|---|---|---|---|
| ENTRY NUMBER | 0 | 1 | 2 | ... |
| PORT NUMBER | 80 | 8080 | 143 | ... |
| TYPE OF PROTOCOL | TCP | TCP | TCP | ... |
| COUNTER | ... | ... | ... | ... |

COMMUNICATION STATISTICAL CALCULATION CONDITION TABLE

4163

| ENTRY NUMBER | 0 | 1 | ... | X | X+1 | ... |
|---|---|---|---|---|---|---|
| IP ADDRESS | 192.168.5.23 | 192.168.5.24 | ... | — | — | ... |
| PORT NUMBER | — | — | ... | 80 | 8080 | ... |
| TYPE OF PROTOCOL | — | — | ... | TCP | TCP | ... |

COMMUNICATION STATISTICAL TABLE
(FOR EACH PORT NUMBER)

| 4171 | | | | |
|---|---|---|---|---|
| 41711 | ENTRY NUMBER | 0 | 1 | ... |
| 41712 | PORT NUMBER | 8080 | 80 | ... |
| 41713 | TYPE OF PROTOCOL | TCP | TCP | ... |
| 41714 | NUMBER OF RECEIVED PACKETS | ... | ... | ... |
| 41715 | NUMBER OF DISCARDED PACKETS | ... | ... | ... |
| 41716 | NUMBER OF RECEIVED BYTES | ... | ... | ... |
| 41717 | AVERAGE CONSUMPTION BAND | ... | ... | ... |
| 41718 | MEASUREMENT DATE | ... | ... | ... |

FIG. 4B

COMMUNICATION STATISTICAL TABLE
(FOR EACH COMMUNICATION ROUTE)

4172

| ENTRY NUMBER | 0 | 1 | 2 | 3 | ... |
|---|---|---|---|---|---|
| TRANSMISSION SOURCE NETWORK ADDRESS | 192.168.123.0/24 | 192.168.126.0/24 | 192.168.213.0/24 | 192.168.215.0/24 | ... |
| IP ADDRESS | 192.168.5.23 | 192.168.5.24 | 192.168.5.23 | 192.168.5.24 | ... |
| NUMBER OF RECEIVED PACKETS | ... | ... | ... | ... | ... |
| NUMBER OF DISCARDED PACKETS | ... | ... | ... | ... | ... |
| NUMBER OF RECEIVED BYTES | ... | ... | ... | ... | ... |
| AVERAGE CONSUMPTION BAND | ... | ... | ... | ... | ... |
| MEASUREMENT DATE | ... | ... | ... | ... | ... |

| | | 4240A | |
|---|---|---|---|
| 4241A | ENTRY NUMBER | 0 | ... |
| 4241A | TRANSMISSION SOURCE NETWORK ADDRESS | 192.168.123.0/24 | ... |
| 4242A | DESTINATION IP ADDRESS | 192.168.5.23 | ... |
| 4243A | RECEIVED-PACKET NUMBER (TIME-SERIES) | ... | ... |
| 4244A | DISCARDED-PACKET NUMBER (TIME-SERIES) | ... | ... |
| 4245A | RECEIVED-PACKET NUMBER (TIME-SERIES) | ... | ... |
| 4246A | AVERAGE CONSUMPTION BAND (TIME-SERIES) | ... | ... |

FIG. 12B

| | | 4240C | | |
|---|---|---|---|---|
| 4241B | ENTRY NUMBER | 0 | 1 | ... |
| 4241B | TRANSMISSION SOURCE NETWORK ADDRESS | 192.168.123.0/24 | 192.168.126.0/24 | ... |
| 4242B | DESTINATION IP ADDRESS | 192.168.5.23 | 192.168.5.24 | ... |
| 4243B | RECEIVED-PACKET NUMBER (TIME-SERIES) | ... | ... | ... |
| 4244B | DISCARDED-PACKET NUMBER (TIME-SERIES) | ... | ... | ... |
| 4245B | RECEIVED-PACKET NUMBER (TIME-SERIES) | ... | ... | ... |
| 4246B | AVERAGE CONSUMPTION BAND (TIME-SERIES) | ... | ... | ... |

FIG. 12C

| | | 4240B | |
|---|---|---|---|
| 4241C | ENTRY NUMBER | 0 | ... |
| 4241C | TRANSMISSION SOURCE NETWORK ADDRESS | 192.168.126.0/24 | ... |
| 4242C | DESTINATION IP ADDRESS | 192.168.5.24 | ... |
| 4243C | RECEIVED-PACKET NUMBER (TIME-SERIES) | ... | ... |
| 4244C | DISCARDED-PACKET NUMBER (TIME-SERIES) | ... | ... |
| 4245C | RECEIVED-PACKET NUMBER (TIME-SERIES) | ... | ... |
| 4246C | AVERAGE CONSUMPTION BAND (TIME-SERIES) | ... | ... |

NETWORK ABNORMALITY DETECTION SYSTEM, MEASUREMENT APPARATUS, AND ANALYSIS APPARATUS

CROSS-REFERENCE TO RELATED APPLICATION

This application claims the priority of Japanese Patent Application No. 2012-250799 filed Nov. 15, 2012, which is incorporated herein by reference in its entirety.

BACKGROUND

The disclosed subject matter relates to a method of detecting abnormality occurring during communication performed in an information processing system using a computer network.

In recent years, in a facility called a data center, in general, a plurality of server groups have normally been operated to continuously provide various services to users. In the data center, a plurality of network apparatuses are placed to perform communication between the server groups or communication between communication apparatuses such as personal computers or high-performance mobile phones of users and the server groups via the Internet. When a communication failure occurs due to hardware breakdown or software trouble in any one of the network apparatuses, services may not be provided to a plurality of users. Therefore, there is a concern that a data center operator may suffer a great loss of money depending on cases. For this reason, network administrators of the data center have to minimize the effects of failure by installing a network monitoring system that normally monitors the plurality of network apparatuses, and detects and treats the occurrence of a failure as quickly as possible.

JP-A-2005-285040 (hereinafter, referred to as Document 1) discloses a technology for collecting monitoring information based on obtained information with reference to a monitoring rule DB in which information regarding signs of a failure is registered in advance, when a network monitoring system detects the signs of a failure (Abstract). Accordingly, since information simultaneously being monitored can be reduced, a monitoring interval can be shortened.

JP-A-2010-186310 (hereinafter, referred to as Document 2) discloses a technology for registering a distribution of collapse of a correlation model in advance at the time of abnormality in an operational management apparatus and considering as the sign of a failure when an operational management apparatus determines that the distribution of the collapse of a correlation model at the time of abnormality tends to approximate a distribution of collapse when the system operates (Paragraph 0013). Accordingly, even when the number of collapsed failure models is small, abnormality can be detected.

SUMMARY

Document 1 gives an example in which the network monitoring system acquires route information from routers in which a packet discarding rate is large (Paragraphs 0061 and 0067). However, since routers which are network apparatuses performing a communication process are monitoring targets, there is a problem that a process of monitoring the routers itself causes an increase in a processing load on the routers.

For example, in over 10 Gbps network, a communication monitoring process itself in a network apparatus causes an increase in a load on a processor of the network apparatus, and thus causes deterioration in reliability or availability of a network system in some cases. Further, when the network apparatus as monitoring target is broken down, there is a probability of data measured and maintained by the network apparatus being erroneous.

That is, Document 1 does not disclose a technology for avoiding a problem of a load increase of the network apparatus occurring at the time of execution of a communication monitoring process or an error of monitoring data itself occurring due to breakdown of the network apparatus.

Further, in the technology disclosed in Document 1, as an amount of information to be monitored increases, for example, at the time of measuring monitoring information of a high layer such as a network layer or a transport layer, a registration amount of information in the monitoring rule DB may increase and a time necessary for a monitoring information collection process and an abnormality determination process may become longer. Therefore, it becomes difficult to monitor the information in a short time. That is, information to be monitored, monitoring rules, is restricted to an amount of information for which collection and determination can be terminated within a practical time and a technology for resolving this problem is not disclosed in Document 1.

For example, to monitor a status of communication performed via a given route, a communication amount from a given IP address of the Internet Protocol (IP) corresponding to the network layer is monitored in some cases. In another example, a communication amount destined for a given port number of the transmission control protocol (TCP) corresponding to the transport layer is monitored in some cases. At this time, when a monitoring target IP address or port number may not be defined in advance, various IP addresses or port numbers in which communication is assumed to be executed are registered as the monitoring rule in the monitoring rule DB. As a result, the time necessary for the monitoring information collection process and the abnormality determination process may become longer.

In the technology disclosed in Document 2, it is necessary to register the distribution of the collapse of the correlation model in advance. That is, a technology in a case where the distribution of the collapse may not be registered in advance is not disclosed in Document 2. For example, when it is desired to monitor a network with a new configuration that was not exemplified in the past or it is desired to detect a failure which did not occur in the past, the distribution of the collapse of the correlation model at the time of abnormality is not known in advance. In this case, countermeasures may not be difficult.

Accordingly, it is desirable to provide a technology for solving the above-mentioned problems.

This specification discloses a technology for detecting communication abnormality, while avoiding a problem that a load increases in a communication monitoring process on a network apparatus performing a communication process or a problem that monitoring data itself output by a network apparatus at the time of breakdown may not be reliable.

Further, this specification discloses a technology for detecting communication abnormality, while creating a monitoring rule dynamically during operation without defining communication information (monitoring rule) to be monitored in advance.

Furthermore, this specification discloses an abnormality detection method in which it does not take much time in a collection process and an abnormality determination process, even when an amount of information to be monitored is vast, for example, when monitoring information of a high layer such as a network layer or a transport layer is measured.

According to an aspect of the disclosure, a network abnormality detection system includes one or more network signal copy apparatuses, a measurement apparatus, and an analysis apparatus. The network signal copy apparatus copies each packet transmitted at a predetermined measurement position in the communication network and transmits the copied packet to the measurement apparatus. The measurement apparatus calculates a communication statistics calculation condition serving as a monitoring rule at each measurement position from the copied packet received from each network signal copy apparatus and calculates communication statistics information based on the communication statistics calculation condition, and then transmits the calculated communication statistics information to the analysis apparatus. The analysis apparatus analyzes the communication statistics information of one or more positions received from the measurement apparatus and notifies a network management server of occurrence of communication abnormality when the occurrence of the communication abnormality is detected.

In the calculation of the communication statistics information, the measurement apparatus stores packet count information counted by analyzing information regarding the received packet in a packet count storage unit, reads and analyzes the stored packet count information, calculates the communication statistics calculation condition at each measurement position, retrieves the packet count storage unit, and calculates the communication statistics information at each measurement position from the packet count information satisfying the communication statistics calculation condition.

The analysis apparatus analyzes a correlation structure of the communication performed in the communication network from the communication statistics information of one or more positions, creates a correlation structure model obtained by modeling a plurality of communications having the correlation, and considers the communication to be abnormal based on the created correlation model when the correlation between the plurality of communication having the correlation is deviated by a value equal to or greater than a predetermined reference value.

In the calculation of the communication statistics calculation condition, the measurement apparatus includes a counter of each port number and a counter of each IP address, reads the stored packet count information, counts transmission source port numbers and destination port numbers included in the read packet count information according to each port number, counts transmission source IP addresses and destination IP addresses included in the read packet count information according to each IP address, extracts port numbers of a high-order predetermined number of the counter values for each port number, extracts IP addresses of a high-order predetermined number of the counter values for each IP address, and sets each of the extracted high-order port numbers and the extracted high-order IP addresses as a communication statistics calculation condition which is a target of the communication structure analysis in the analysis apparatus.

The measurement apparatus repeatedly performs, as triggered by a timer event the calculation of the communication statistics calculation condition serving as a monitoring rule and updates the stored communication statistics calculation condition using the calculation result.

According to the aspect of the disclosure, it is possible to detect communication abnormality, while avoiding the problem that a load increases in a communication monitoring process on a network apparatus performing a communication process or a problem that monitoring data itself output by a network apparatus at the time of breakdown may not be reliable.

According to the aspect of the disclosure, it is possible to realize the abnormality detection method in which it does not take much time for a collection process and an abnormality determination process, even when an amount of information to be monitored is vast, for example, when monitoring information of a high layer such as a network layer or a transport layer is measured.

According to the disclosure, it is possible to provide a network monitoring system that does not deteriorate reliability or availability of a network system without causing a load increase of the network apparatuses performing the communication process.

According to the disclosure, it is possible to provide the network monitoring system that detects communication abnormality without using monitoring data which is output from a network apparatus at the time of breakdown and thus may be erroneous.

According to the disclosure, it is possible to provide the network monitoring system that performs the collection process and the abnormality determination process in a short time even when monitoring information of a high layer such as a network layer or a transport layer is measured.

According to the disclosure, it is possible to provide the network monitoring system even when the network monitoring system monitors a network for which a distribution of collapse of a correlation model at the time of abnormality is not known in advance.

According to the disclosure, it is possible to provide the network monitoring system that detects communication abnormality in minute units in each communication route without deterioration in reliability or availability of a network system.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example of the structure of a packet counter table of a measurement apparatus according to the first embodiment.

FIG. 3A illustrates an example of the structure of a calculation condition table of the measurement apparatus according to the first embodiment.

FIG. 3B illustrates an example of the structure of a port number counter table of the measurement apparatus according to the first embodiment.

FIG. 3C illustrates an example of the structure of a calculation condition table of the measurement apparatus according to the first embodiment.

FIG. 4A illustrates an example of the structure of a communication statistics table (for each port number) of the measurement apparatus according to the first embodiment.

FIG. 4B illustrates an example of the structure of a communication statistics table (for each communication route) of the measurement apparatus according to the first embodiment.

FIG. 12A exemplifies an expression of communication statistics information received from a measurement apparatus and stored by an entire communication statistics storage unit according to the second embodiment.

FIG. 12B exemplifies an expression of communication statistics information received from a measurement apparatus and stored by an entire communication statistics storage unit according to the second embodiment.

FIG. 12C exemplifies an expression of communication statistics information received from a measurement apparatus and stored by an entire communication statistics storage unit according to the second embodiment.

DETAILED DESCRIPTION OF THE EMBODIMENTS

Hereinafter, embodiments will be described with reference to the drawings.
First Embodiment
First, a configuration example of each element of a network abnormality detection system 40 will be described with reference to FIGS. 1 to 4.

Figure 1:
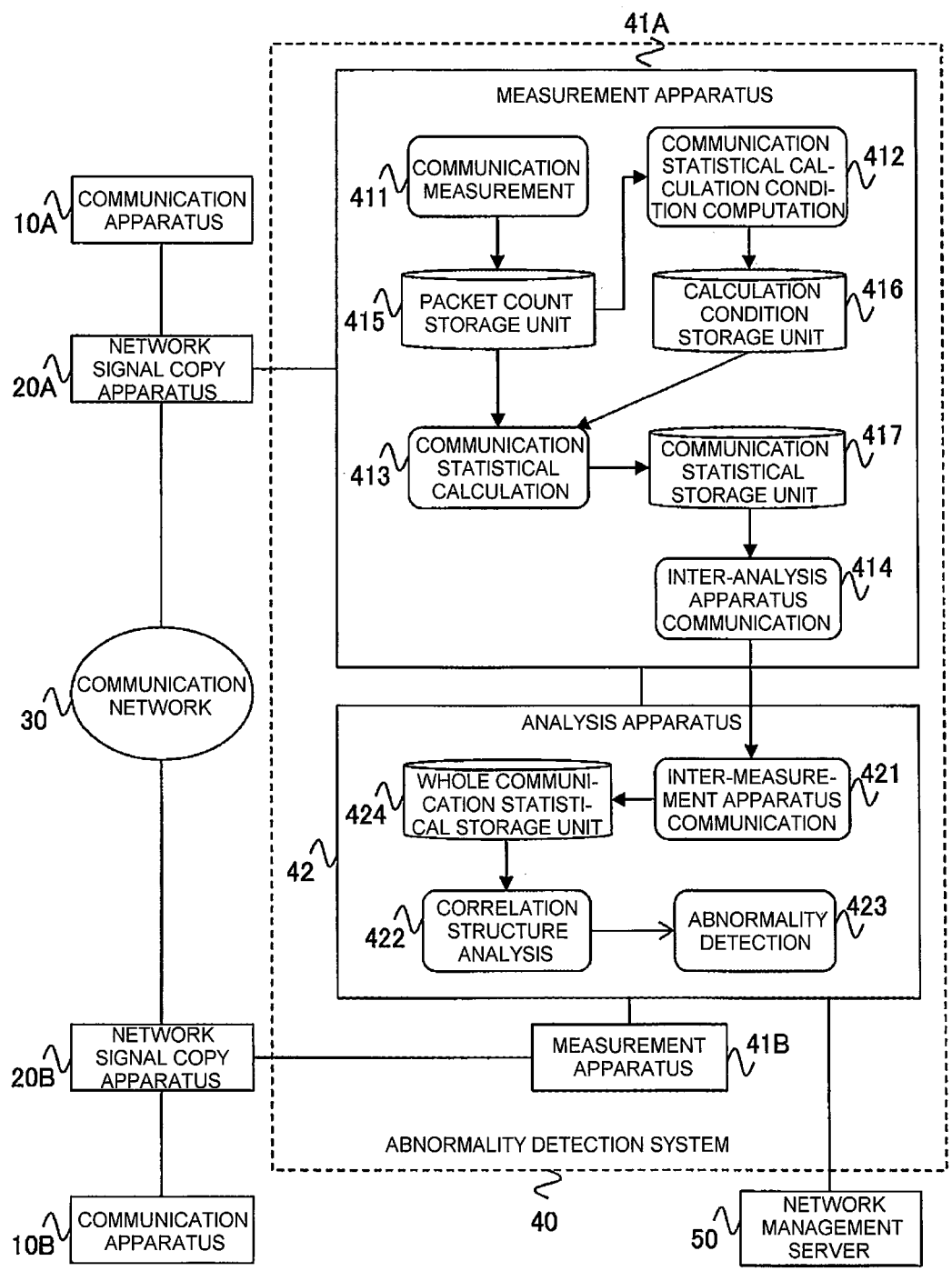
FIG. 1 illustrates an example of the configuration of a network abnormality detection system according to a first embodiment.

FIG. 1 is a block diagram illustrating an example of the configuration of the network abnormality detection system 40.

Communication apparatuses 10 are apparatuses which are coupled to other communication apparatuses 10 via a communication network 30 using a protocol such as Hypertext Transfer Protocol (HTTP) on Transmission Control Protocol/Internet Protocol (TCP/IP) and perform data communication.

Network signal copy apparatuses 20 are apparatuses that copy packets transmitted in the communication network 30 in predetermined measurement positions on the communication network 30 and transmit the copied packets to other apparatuses (measurement apparatuses in the embodiment).

For example, network tap apparatuses correspond to the network signal copy apparatuses.

The network abnormality detection system 40 includes a measurement apparatus 41 that performs a statistics process on the packets copied by the network signal copy apparatus 20 and transmits information (communication statistics information) of the result to an analysis apparatus 42 and the analysis apparatus 42 that analyzes the communication statistics information received from one or more measurement apparatuses 41 and notifies the network management server 50 of the analyzed communication statistics information when detecting communication a abnormality from the analysis result.

The measurement apparatus 41 includes: a communication measurement processing unit 411 that receives packets copied by the network signal copy apparatus 20, and analyzes and counts information regarding the packets; a packet count storage unit 415 that stores the information counted by the communication measurement processing unit 411; a communication statistics calculation condition computation processing unit 412 that reads stored packet count information, analyzes the packet count information, and computes communication statistics calculation condition (hereinafter, simply referred to as a calculation condition in some cases) serving as a monitoring rule which is a communication structure analysis target in the analysis apparatus 42; a calculation condition storage unit 416 that stores the computed calculation condition; a communication statistics calculation processing unit 413 that reads the stored calculation condition, retrieves the packet count information satisfying the calculation condition from the packet count storage unit 415, and performs statistics calculation based on the packet count information satisfying the calculation condition; a communication statistics storage unit 417 that stores the result (communication statistics information) obtained through the statistics calculation; and an inter-analysis apparatus communication processing unit 414 that transmits the stored communication statistics information to the analysis apparatus 42.

The analysis apparatus 42 includes: an inter-measurement apparatus communication processing unit 421 that receives communication statistics information of each measurement position from one more measurement apparatuses 41; an entire communication statistics storage unit 424 that stores the communication statistics information of each measurement position received from one or more measurement apparatuses 41 by the inter-measurement apparatus communication processing unit 421; a correlation structure analysis processing unit 422 that reads the stored communication statistics information of one or more measurement apparatuses 41, analyzes the correlation structure of the whole system communication, and creates a correlation structure model obtained by modeling a plurality of communication having a correlation; and an abnormality detection processing unit 423 that considers communication to be abnormal based on the created correlation structure model when the correlation between the plurality of communications having the correlation is deviated by a value equal to or greater than a predetermined reference value.

Figure 14:
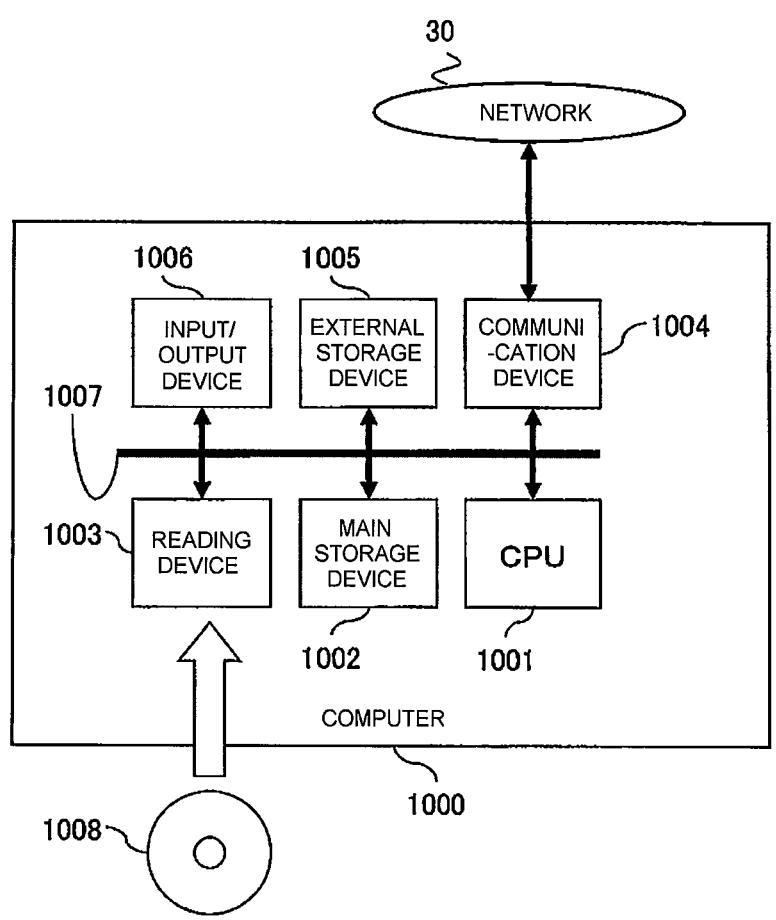
FIG. 14 illustrates a hardware configuration example of each apparatus.

An example of a hardware configuration of each apparatus such as the communication apparatus 10, the measurement apparatus 41, the analysis apparatus 42, and the network management server 50 is illustrated in FIG. 14.

These apparatuses can be realized by a general computer 1000 that includes a CPU 1001, a main storage device 1002, an external storage device 1005 such as an HDD, a reading device 1003 reading information from a storage medium 1008 which is portable, such as a CD-ROM or a DVD-ROM, an input/output device 1006 such as a display, a keyboard, or a mouse, a communication device 1004 such as a network interface card (NIC) coupled to the network 30, and an internal communication line 1007 such as a bus coupling these devices to each other.

For example, the packet count storage unit 415 is realized using a part of the region of the main storage device 1002.

Each apparatus realizes various processing units, various tables, and various processes in the embodiment by the processing units and tables by loading various programs stored in each external storage device 1005 on the main storage device 1002, allowing the CPU 1001 to execute the programs, coupling to the network 30 using the communication device 1004, as necessary, and performing network communication with another communication apparatus 10 or receiving packets from the network signal copy apparatus 20.

The packet count information stored in the packet count storage unit 415 and recorded in a packet counter table 4150 will be described in detail with reference to FIG. 2.

Each entry (in FIG. 2, one entry is expressed in a vertical line) of the packet counter table 4150 includes a region storing header information (an IP address, a port number, a protocol number, and the like) of each packet and a region storing the packet count information (the number of packets, the number of bytes, and the like). Specifically, each entry includes an entry number field 4151 managing an entry number, a transmission source IP address field 4152 storing a transmission source IP address, a destination IP address field 4153 storing a destination IP address, a protocol type field 4154 storing the type of protocol, a transmission source port number field 4155 storing a transmission source port number, a destination port number field 4156 storing destination a port number, a received-packet number field 4157 which is a counter region of the number of received packets, a discard-packet number field 4158 which is a counter region of the number of discarded packets, and a received-byte number field 4159 which is a storage region of the number of received bytes.

Next, a counter table 4161 of each IP address, a counter table 4162 of each port number, and a communication statistics calculation condition table 4163 will be described with reference to FIGS. 3A to 3C.

Each entry (in FIGS. 3A to 3C, one entry is expressed in a vertical line) of the counter table 4161 of each IP address includes an entry number field 41611 managing an entry number, an IP address field 41612 storing an IP address, and a counter region 41613 of the number of received packets.

Each entry of the counter table 4162 of each port number includes an entry number field 41621 managing an entry number, a port number field 41622 storing a port number, a protocol type field 41623 storing the type of protocol, and a counter region 41624 of the number of received packets.

Each entry of the communication statistics calculation condition table 4163 includes an entry number field 41631 managing an entry number, an IP address field 41632 storing an IP address, a port number field 41633 storing a port number, and a protocol type field 41634 storing the type of protocol.

Next, a communication statistics table (for each port number) 4171 and a communication statistics table (for each communication route) 4172 will be described with reference to FIGS. 4A and 4B.

Each entry (in FIGS. 4A and 4B, one entry is expressed in a vertical line) of the communication statistics table (for each port number) 4171 includes an entry number field 41711 managing an entry number, a port number field 41712 storing a port number, a protocol type field 41713 storing the type of protocol, a received-packet number field 41714 which is a counter region of the number of received packets, a discarded-packet number field 41715 which is a counter region of the number of discarded packets, a received-byte number field 41716 which is a storage region of the number of received bytes, an average consumption band field 41717 storing an average consumption band amount, and a measurement date field 41718 storing a statistics calculation date.

Each entry of the communication statistics table (for each communication route) 4172 includes an entry number field 41721 managing an entry number, a transmission source network address field 41722 storing a transmission source network address, a destination IP address field 41723 storing a destination IP address, a received-packet number field 41724 which is a counter region of the number of received packets, a discarded-packet number field 41725 which is a counter region of the number of discarded packets, a received-byte number field 41726 which is a storage region of the number of received bytes, an average consumption band field 41727 storing an average consumption band amount, and a measurement date field 41728 storing a statistics calculation date.

Hereinafter, a network abnormality detection method in the network abnormality detection system 40 according to the first embodiment will be described with reference to FIGS. 5 to 10.

Figure 5:
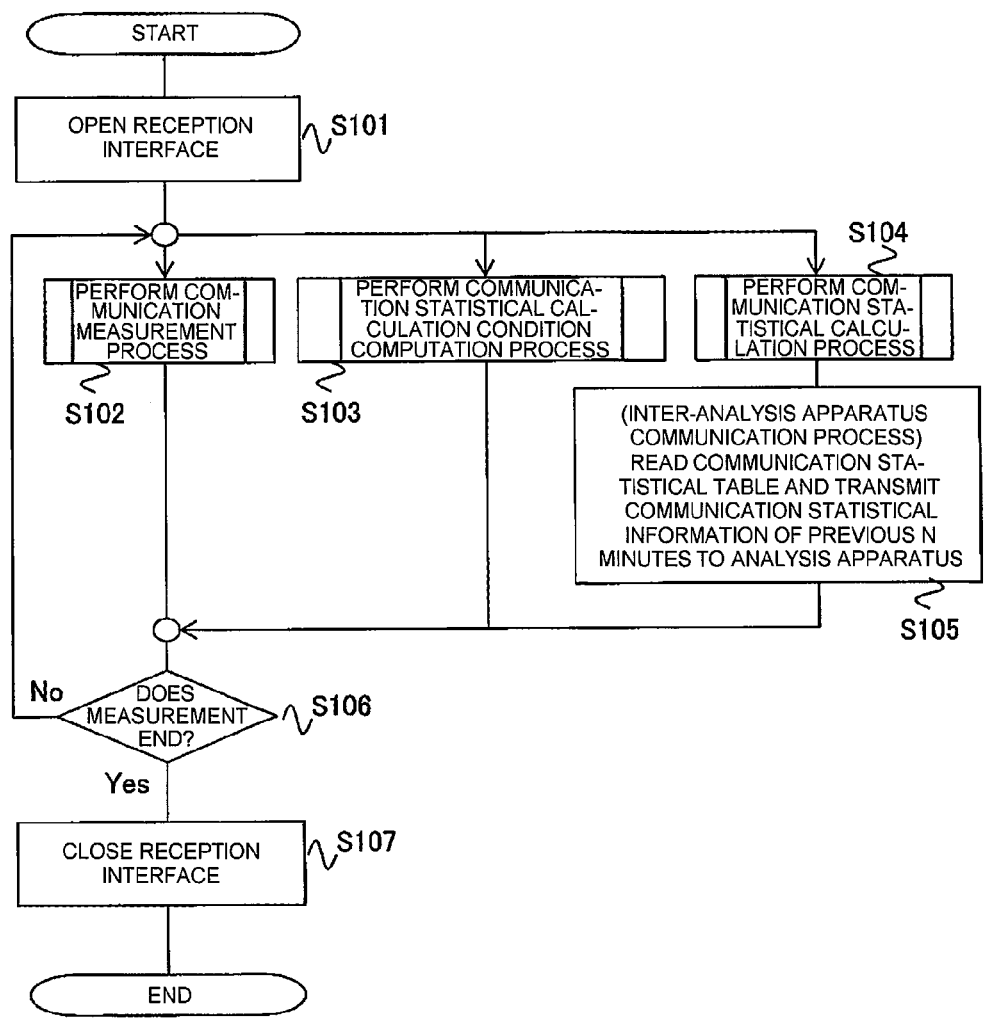
FIG. 5 exemplifies the flow of an overall process of the measurement apparatus according to the first embodiment.

FIG. 5 is a flowchart exemplifying an overall process performed in the measurement apparatus 41.

The measurement apparatus 41 first opens a reception interface to receive packets from the network signal copy apparatus 20 (step S101).

Next, the process is divided by multi-thread activation or the like, and then a communication measurement process (step S102) performed by the communication measurement processing unit 411, a communication statistics calculation condition computation process (step S103) performed by the communication statistics calculation condition computation processing unit 412, and a communication statistics calculation process (step S104) performed by the communication statistics calculation processing unit 413 are performed.

After the communication statistics calculation process (step S104), the inter-analysis apparatus communication processing unit 414 reads the communication statistics table (for each port number) 4171 and the communication statistics table (for each communication route) 4172 and transmits a history of the communication statistics information to the analysis apparatus 42 (step S105). Here, the length of a time of the history may be written on a setting file of the measurement apparatus 41 in advance and may be read and set when the measurement apparatus 41 is activated.

After performing the processes of step S102 to step S105, the measurement apparatus 41 determines whether a measurement process ends due to an input of an ending command or the like. When the measurement process does not end, processes, that is, the communication measurement process (step S102), the communication statistics calculation condition computation process (step S103), and the communication statistics calculation process (step S104) are continuously performed (step S106). When the measurement process ends, the reception interface is closed (step S107) and the process ends.

Figure 6:
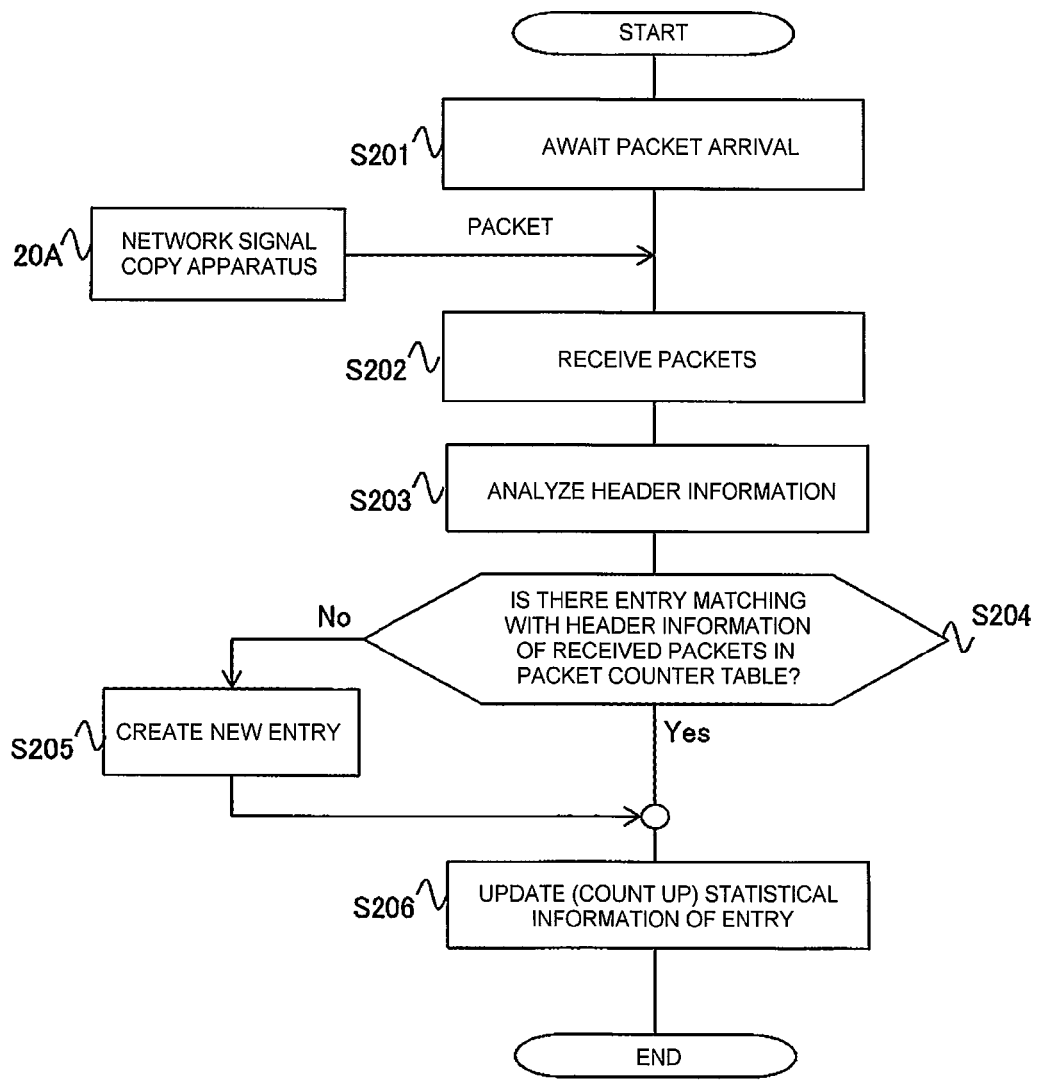
FIG. 6 exemplifies the flow of a communication measurement process of the measurement apparatus according to the first embodiment.

FIG. 6 is a flowchart exemplifying the communication measurement process (step S102 of FIG. 5) performed by the communication measurement processing unit 411 of the measurement apparatus 41.

The communication measurement processing unit 411 first performs a packet arrival awaiting process (step S201). When the communication measurement processing unit 411 receives copied packets from the network signal copy apparatus 20 (step S202), the communication measurement processing unit 411 analyzes the header information of the packets (step S203), retrieves the packet counter table 4150, and examines whether there is an entry including the header information satisfying a predesignated condition.

The condition is, for example, a condition in which a transmission source IP address, a destination IP address, the type of protocol, a transmission source port number, and a destination port number included in the header information are identical, but another condition may be designated (step S204).

When there is no entry satisfying the condition, the communication measurement processing unit 411 creates a new entry (step S205). Then, the communication measurement processing unit 411 counts up the value of the received-packet number 4157 of the statistics information of the corresponding entry and adds size information of the received packets to the value of the number of received bytes 4159 (step S206).

Figure 7:
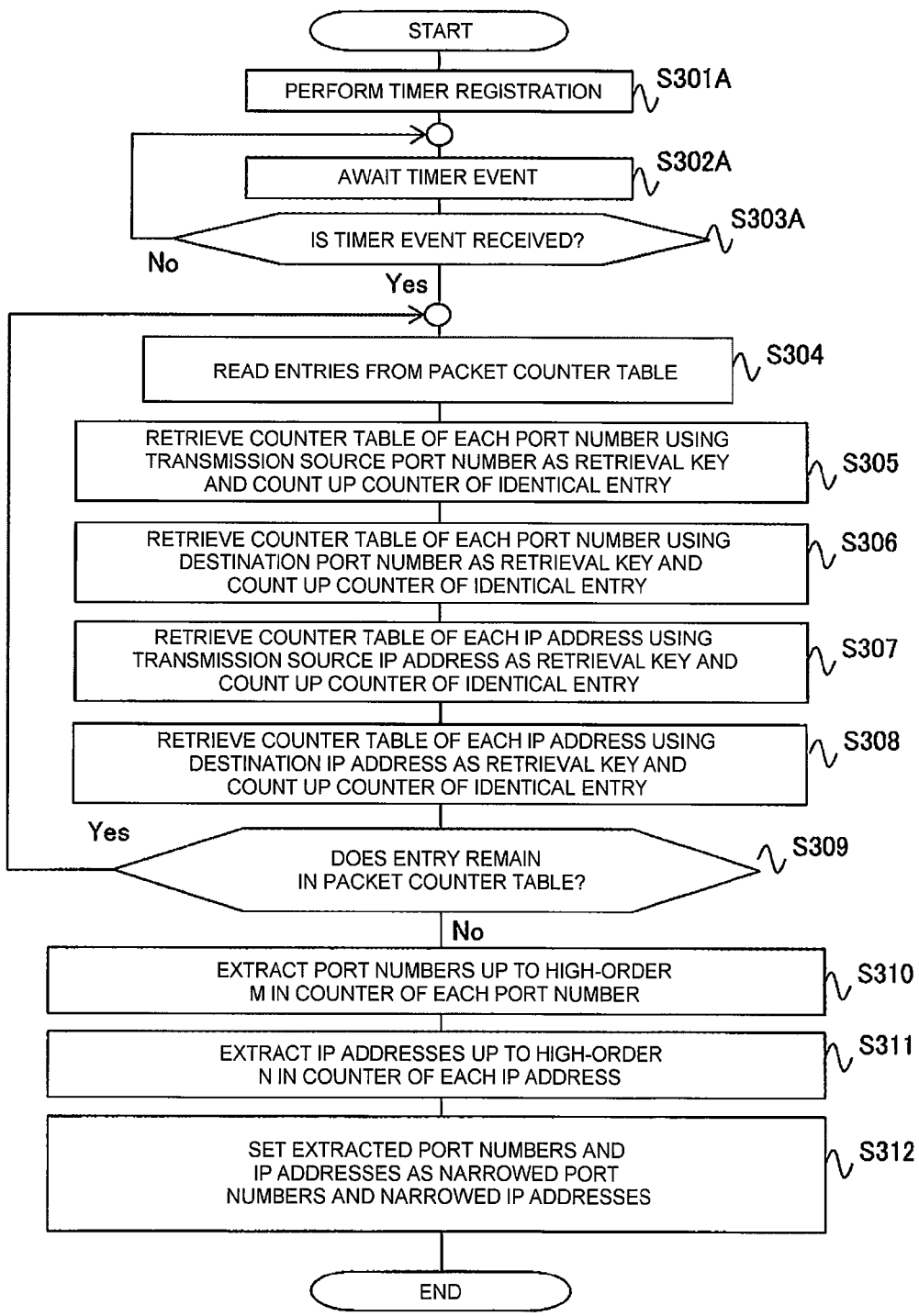
FIG. 7 exemplifies the flow of a communication statistics calculation condition computation process of the measurement apparatus according to the first embodiment.

FIG. 7 is a flowchart exemplifying the communication statistics calculation condition computation process (step S103 of FIG. 5) performed by the communication statistics calculation condition computation processing unit 412 of the measurement apparatus. The communication statistics calculation condition computation process is a process of computing a condition for a statistics calculation target in the communication statistics calculation process performed by the communication statistics calculation processing unit 413. In the embodiment, a port number and an IP address have been exemplified as the condition, but other items may be set as the condition.

The communication statistics calculation condition computation processing unit 412 of the measurement apparatus 41 first performs timer registration, for example, by calling a timer registration function provided by an operating system (OS) of the measurement apparatus 41 (step S301), and then awaits a timer event (step S302).

Then, when the communication statistics calculation condition computation processing unit 412 receives an interrupt event from the OS and the interrupt event is not the timer event, the process of step S302 is continuously performed (step S303). When the interrupt event is the timer event, the communication statistics calculation condition computation processing unit 412 reads entry information from the packet counter table 4150 (step S304). Here, the communication statistics calculation condition computation processing unit 412 selects a subsequent entry of the entry referred to at the time of step S309 as an entry to be read from the packet counter table 4150 after step S309 to be described below. For example, when the communication statistics calculation condition computation processing unit 412 starts reading an entry with the value of the entry number 4151 of 0, the communication statistics calculation condition computation processing unit 412 subsequently reads an entry with the value of the entry number 4151 of 1 and subsequently reads an entry with the value of the entry number 4151 of 2 in sequence after step S309.

Next, the communication statistics calculation condition computation processing unit 412 retrieves the counter table 4162 for each port number from information regarding the entries read in step S304 using a transmission source port number as a retrieval key and counts up the value of the counter 41624 of the entry for which the transmission source port number is identical (step S305). Likewise, the communication statistics calculation condition computation processing unit 412 retrieves the counter table 4162 for each port number using a destination port number of the entry read in step S304 as a retrieval key and counts up the value of the counter 41624 of the entry for which the destination port number is identical (step S306).

Subsequently, the communication statistics calculation condition computation processing unit 412 retrieves the counter table 4161 of each IP address using the transmission source IP address of the entry read in step S304 as a retrieval key and counts up the value of the counter 41613 of the entry for which the transmission source IP address is identical (step S307).

Further, the communication statistics calculation condition computation processing unit 412 retrieves the counter table 4161 of each IP address using the destination IP address of the entry read in step S304 as a retrieval key and counts up the value of the counter 41613 of the entry for which the destination IP address is identical (step S308).

After step S308 ends, the communication statistics calculation condition computation processing unit 412 determines whether there is information regarding a subsequent entry of the entry read in step S304 in the packet counter table 4150 (step S309). When there is the information regarding the subsequent entry, the process of step S304 is continuously performed on the subsequent entry.

Conversely, when there is no information regarding the subsequent entry, the communication statistics calculation condition computation processing unit 412 subsequently extracts M pairs of port numbers for which a communication amount is large in conjunction with the types of protocol (step S310). For example, the communication statistics calculation condition computation processing unit 412 sorts the entries in the larger order of the values of the counters 41624 in the counter table 4162 of each port number, extracts the entries up to the high-order M from the largest value, and extracts the M pairs of port numbers in conjunction with the types of protocol with reference to the values of the port numbers 41622 of the extracted respective entries.

Likewise, the communication statistics calculation condition computation processing unit 412 extracts N IP addresses for which the communication amount is large (step S311). For example, the communication statistics calculation condition computation processing unit 412 sorts the entries in the large order of the values of the counters 41613 in the counter table 4161 of each IP address, extracts the entries up to high-order N from the largest value, and extracts the N IP addresses with reference to the values of the IP addresses 41612 of the extracted respective entries.

Here, the values of M and N may be assumed to be positive integers and be written in the setting file of the measurement apparatus 41 in advance, and the values may be read and set when the measurement apparatus 41 is activated.

Then, The M pairs of port numbers and types of protocols extracted in step S310 and the N IP addresses extracted in step S311 are set as separate entries in the communication statistics calculation condition table 4163. When the values are set in advance in the communication statistics calculation condition table 4163, the values are updated (step S312).

In the embodiment, as described above, when the communication apparatus 10 is performing communication, the computation of the communication statistics calculation condition is characterized as being repeatedly performed, as triggered by the timer event, and the value is characterized as being dynamically updated when the value is set in advance.

Figure 8:
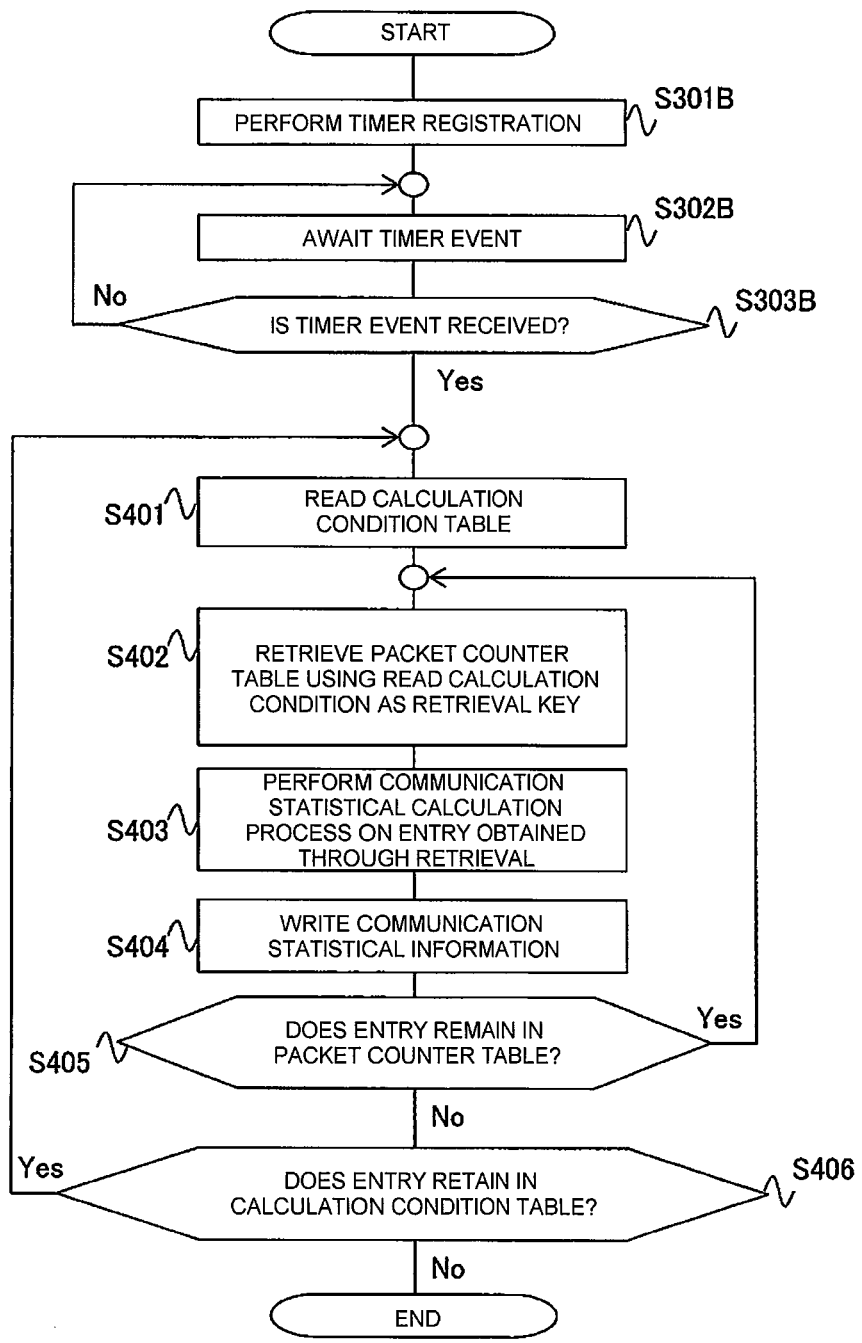
FIG. 8 exemplifies the flow of a communication statistics calculation process of the measurement apparatus according to the first embodiment.

FIG. 8 is a flowchart exemplifying the communication statistics calculation process (step S104 of FIG. 5) performed by the communication statistics calculation processing unit 413 of the measurement apparatus.

Processes of step S301 to step S303 are the same as those of FIG. 7. When the communication statistics calculation processing unit 413 receives an interrupt event from the OS in step S303 and the interrupt event is the timer event, the communication statistics calculation processing unit 413 reads entry information from the communication statistics calculation condition table 4163 (step S401). Here, the communication statistics calculation processing unit 413 selects a subsequent entry of the entry referred to at the time of step S405 as an entry to be read from the communication statistics calculation condition table 4163 after step S405 to be described below. For example, when the communication statistics calculation condition computation processing unit 412 starts reading an entry with the value of the entry number 4151 of 0, the communication statistics calculation condition computation processing unit 412 subsequently reads an entry with the value of the entry number 4151 of 1 and subsequently reads an entry with the value of the entry number 4151 of 2 in sequence after step S405.

Next, the communication statistics calculation processing unit 413 retrieves the packet counter table 4150 using the communication statistics calculation condition read in step S401 as a retrieval key (step S402). For example, when an IP address is set in the IP address 41632 of the entry referred to in step S401, the communication statistics calculation processing unit 413 sets the transmission source IP address 4152 and the destination IP address 4153 of the packet counter table 4150 as retrieval targets and performs the retrieval using the IP address of the IP address 41632 of the referred entry as a retrieval key, and extracts the entry for which one of the transmission source IP address 4152 and the destination IP address 4153 is identical. Further, when the port number and the type of protocol are set in the port number 41633 and the protocol type 41634 of the entry referred to in step S401, the communication statistics calculation processing unit 413 sets the transmission source port number 4155 and the destination port number 4156 of the packet counter table 4150 as retrieval targets and retrieves the entry for which both of the port number 41633 and the protocol type 41634 are identical, using the port number of the port number 41633 and the protocol type 41634 of the referred entry as retrieval keys.

Next, the statistics calculation is performed on the entry for which the retrieval keys are identical (step S403), the calculation result paired with a current date is written on the communication statistics table (for each port number) 4171 and the communication statistics table (for each communication route) 4172 (step S404).

Here, the statistics calculation of step S403 refers to a process of adding the values of the packet count information.

For example, in step S402, when the value of the port number 41633 of the entry referred to in step S401 is "8080" and the value of the protocol type 41634 is a value indicating "TCP," the communication statistics calculation processing unit 413 retrieves the entry in which the value of the transmission source port number 4155 of the packet counter table 4150 is "8080" and the value of the destination port number 4156 is the value indicating "TCP." Then, in step S403 and step S404, the communication statistics calculation processing unit 413 writes the value of the port number 41633, "8080," and the value of the protocol type 41634, "TCP," on the port number 41712 of the communication statistics table (for each port number) 4171 and the protocol type 41713, respectively, acquires the value of the received-packet number 4157 of the entry identical in step S402, the value of the discarded-packet number 4158, and the value of the received-byte number 4159, adds and writes the value of the received-packet number 4157, the value of the discarded-packet number 4158, and the value of the received-byte number 4159 to the values of the received-packet number 41714, the discarded-packet number 41715, and the received-byte number 41716 of the communication statistics table (for each port number) 4171, and writes a value of a calculated average consumption band from the value of the received-byte number 4159 to the average consumption band 41717 of the communication statistics table (for each port number) 4171. Further, the current date is written to the measurement date field 41718.

For example, in step S402, when the value of the IP address 41632 of the entry referred to in step S401 is "192.168.5.23," the communication statistics calculation processing unit 413 retrieves the entry in which the value of the destination IP address 4153 of the packet counter table 4150 is "192.168.5.23." Then, in step S403 and step S404, when the communication statistics calculation processing unit 413 writes the value of the IP address 41632, "192.168.5.23," to the destination IP address 41723 of the communication statistics table (for each communication route) 4172 and the value of the transmission source IP address 4152 of each entry identical in step S402 is "192.168.123.34," the communication statistics calculation processing unit 413 organizes an IP address in a subnet unit of netmask 24 bits (/24) and writes the IP address as "192.168.123.0/24" to the transmission source network address 41722, acquires the value of the received-packet number 4157, the value of the discarded-packet number 4158, and the value of the received-byte number 4159 of the entry identical in step S402, adds and writes the value of the received-packet number 4157, the value of the discarded-packet number 4158, and the value of the received-byte number 4159 to the received-packet number 41724, the discarded-packet number 41725, and the received-byte number 41726 of the communication statistics table (for each communication route) 4172, and writes a value calculated as an average consumption band from the value of the received-byte number 4159 to the average consumption band 41727 of the communication statistics table (for each communication route) 4172. Further, 24 bits have been exemplified as the netmask, but any value may be used by providing the value as a parameter to the setting file. An IPv4 address has been exemplified as the IP address, but an IPv6 address may be used as the IP address. Further, the current date is written to the measurement date field 41728.

It is determined whether there is information in a subsequent entry of the entry read in step S402 in the packet counter table 4150 (step S405). When there is the information, the process of step S402 is continuously performed on the subsequent entry.

Conversely, when there is no information, it is determined whether there is information in a subsequent entry of the entry read in the communication statistics calculation condition table 4163 in step S401. When there is the information, the process of step S401 is continuously performed on the subsequent entry. Conversely, when there is no information, the process ends (step S406).

In step S105, the measurement apparatus 41 transmits the values of the measurement date 41718 and the measurement date 41728 to the analysis apparatus 42 by grouping these values with the values of the other fields.

Figure 9:
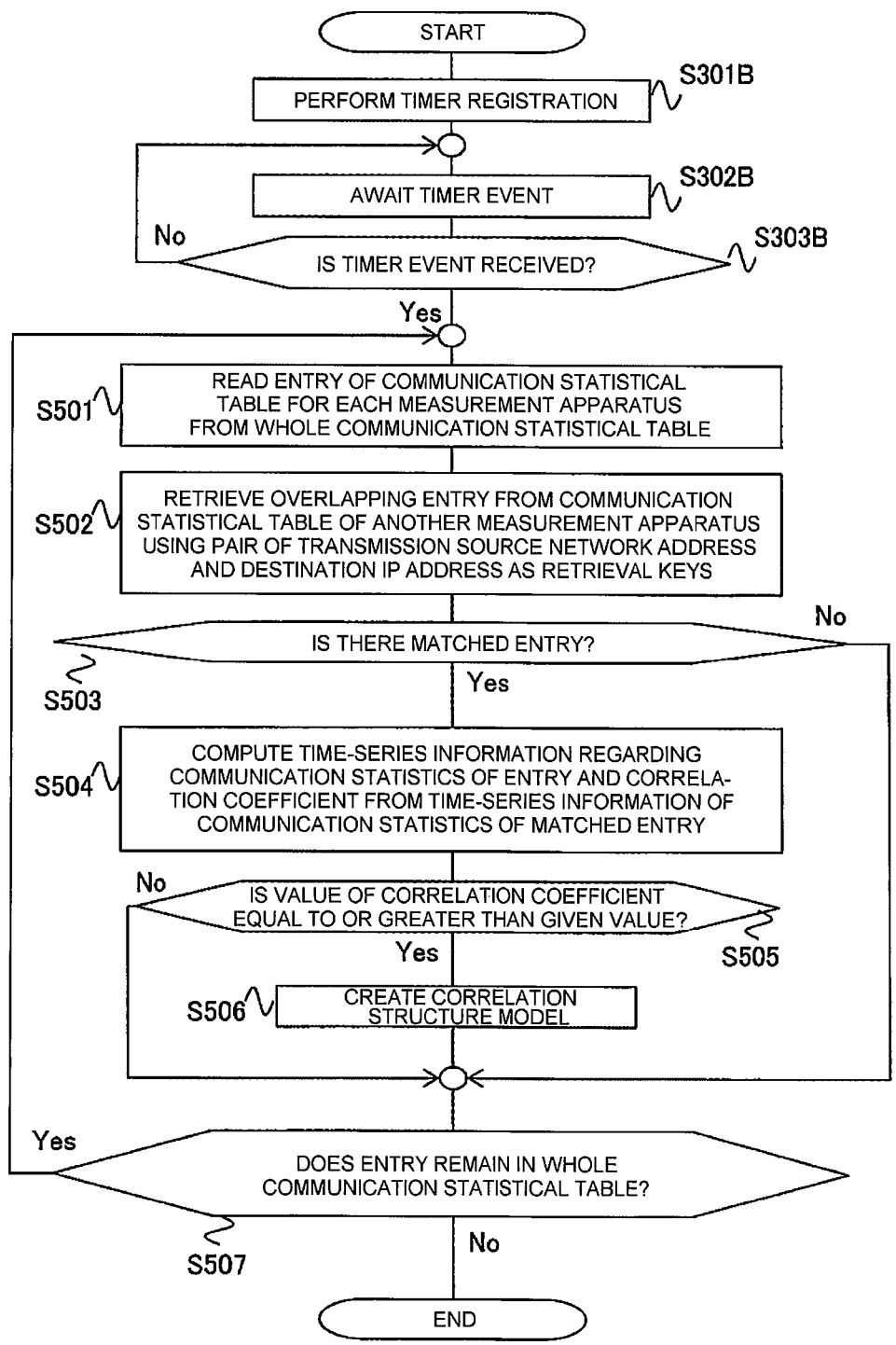
FIG. 9 exemplifies the flow of a correlation structure analysis process of an analysis apparatus according to the first embodiment.

FIG. 9 is a flowchart exemplifying a correlation structure analysis process in the correlation structure analysis processing unit 422 of the analysis apparatus 42. Processes of step S301 to step S303 are the same as those of FIG. 7.

The correlation structure analysis processing unit 422 of the analysis apparatus 42 first reads an entry of the communication statistics table (for each measurement apparatus) 4240 allocated for the measurement apparatus 41 and stored by the whole communication statistics storage unit 424 (step S501).

The whole communication statistics storage unit 424 allocates one communication statistics table (for each measurement apparatus) 4240 to each measurement apparatus 41 and maintains the number of communication statistics tables (for each measurement apparatus) 4240 by the number of the measurement apparatuses 41 present in the network abnormality detection system 40.

Here, an example of the communication statistics table (for each measurement apparatus) 4240 of the analysis apparatus 42 is illustrated in FIG. 12A.

Each entry of the communication statistics table (for each measurement apparatus) 4240 includes an entry number field 4247 managing an entry number, a transmission source network address field 4241 storing a transmission source network address, a destination IP address field 4242 storing a destination IP address, a received-packet number field 4243 storing time-series information regarding the number of received packets, a discarded-packet number field 4244 storing time-series information regarding the number of discarded packets, a received-byte number field 4245 storing time-series information regarding the number of received bytes, and an average consumption band field 4246 storing time-series information regarding an average consumption band amount.

To store the time-series information, the received-packet number field 4243, the discarded-packet number field 4244, the received-byte number field 4245, and the average consumption band field 4246 include a region having a structure configured to store a value and a measurement date as a pair and a region having a structure configured to store the plurality of regions.

Referring back to the description of FIG. 9, the correlation structure analysis processing unit 422 retrieves an identical entry on pairs of the transmission source network addresses 4241 and the destination IP addresses 4242 of the communication statistics table (for each measurement apparatus) 4240 allocated for the measurement apparatus 41 other than the measurement apparatus 41 and read in step S501 in the communication statistics table (for each measurement apparatus) 4240 using the pair of the value of the transmission source network address 4241 and the value of the destination IP address 4242 as retrieval keys (step S502).

When there is the identical entry (step S503), a correlation coefficient is computed from time-series information regarding the communication statistics of the entry and the time-series information regarding the communication statistics of the identical entry (step S504). Here, the time-series information of the communication statistics refers to information stored in the received-packet number 4243, the discarded-packet number 4244, the received-byte number 4245, and the average consumption band 4246. For example, the Pearson's product-moment correlation coefficient may be used as the correlation coefficient.

Whether the value of the computed correlation coefficient is equal to or greater than a given value (for example, 0.7) is checked (step S505) and a correlation structure model is created (step S506). The correlation structure model refers to data used to manage information regarding a pair of two pieces of time-series information of the communication statistics of which the degree of correlation is strong.

When there is the subsequent entry of the entry read from the communication statistics table (for each measurement apparatus) 4240 in step S501 or there is an unread communication statistics table (for each measurement apparatus) 4240, the process returns to step S501. Otherwise, the process ends and the process returns to step S301B.

Figure 10:
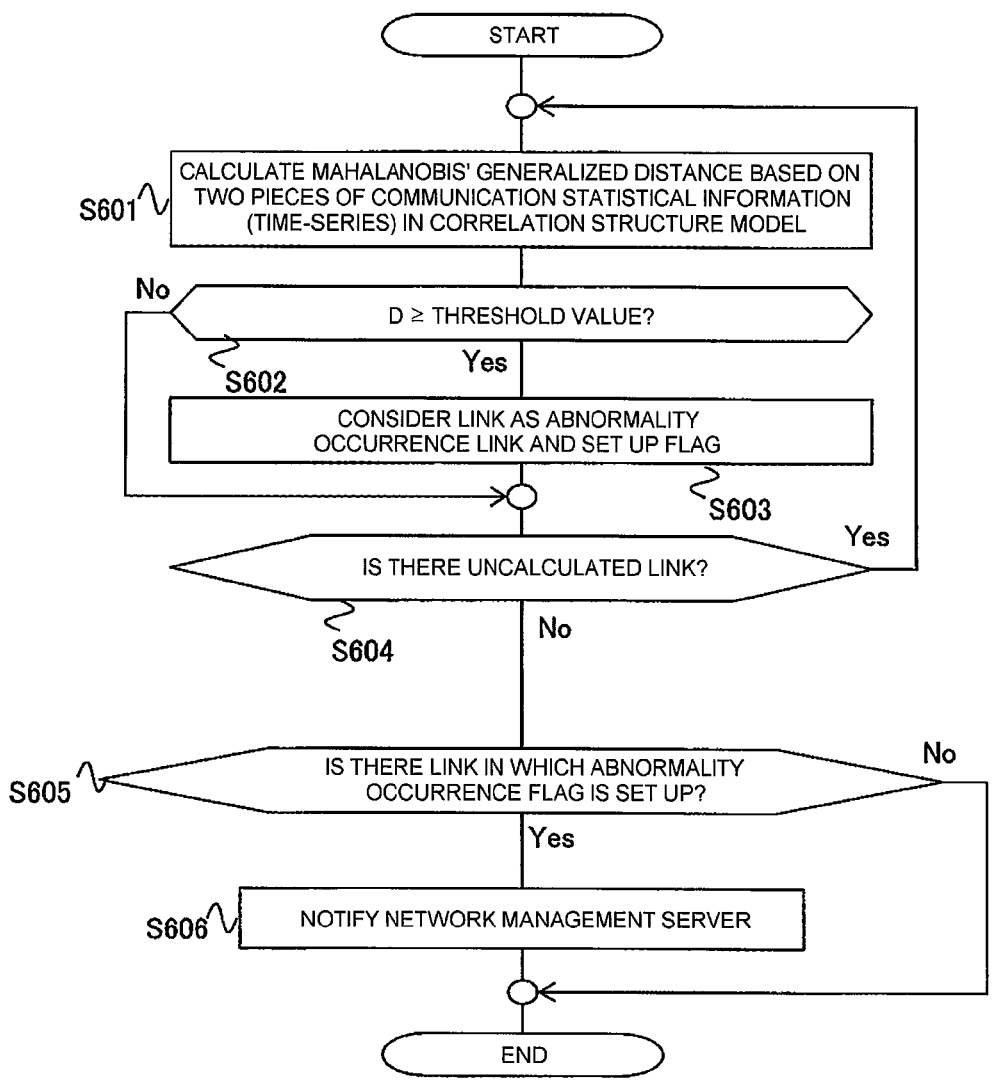
FIG. 10 exemplifies the flow of an abnormality detection process of the analysis apparatus according to the first embodiment.

FIG. 10 is a flowchart exemplifying an abnormality detection process performed by the abnormality detection processing unit 423 of the analysis apparatus 42.

The abnormality detection processing unit 423 of the analysis apparatus 42 calculates a value D indicating the degree of abnormality based on a combination of time-series data of two pieces of communication statistics information in the correlation structure model (step S601). The Mahalanobis' generalized distance may be used as a method of calculating the degree of abnormality D.

When the degree of abnormality D is equal to or greater than a given threshold value (step S602), abnormality is considered to occur in the combination of the time-series data, and information regarding the combination and a value (abnormality occurrence flag) indicating the occurrence of the abnormality in the combination are stored (step S603).

When there is a combination of the time-series data of uncalculated communication statistics information, the process returns to step S601 (step S604).

When there is no combination of the time-series data of the uncalculated communication statistics information and there is the combination of the time-series data for which the abnormality occurrence flag is stored in step S603, the network management server 50 is notified of occurrence of communication abnormality together with the information regarding the combination of the time-series data at that time (step S606).

Second Embodiment

A method of detecting abnormality of a communication route will be described with reference to FIGS. 11 to 13.

Figure 11:
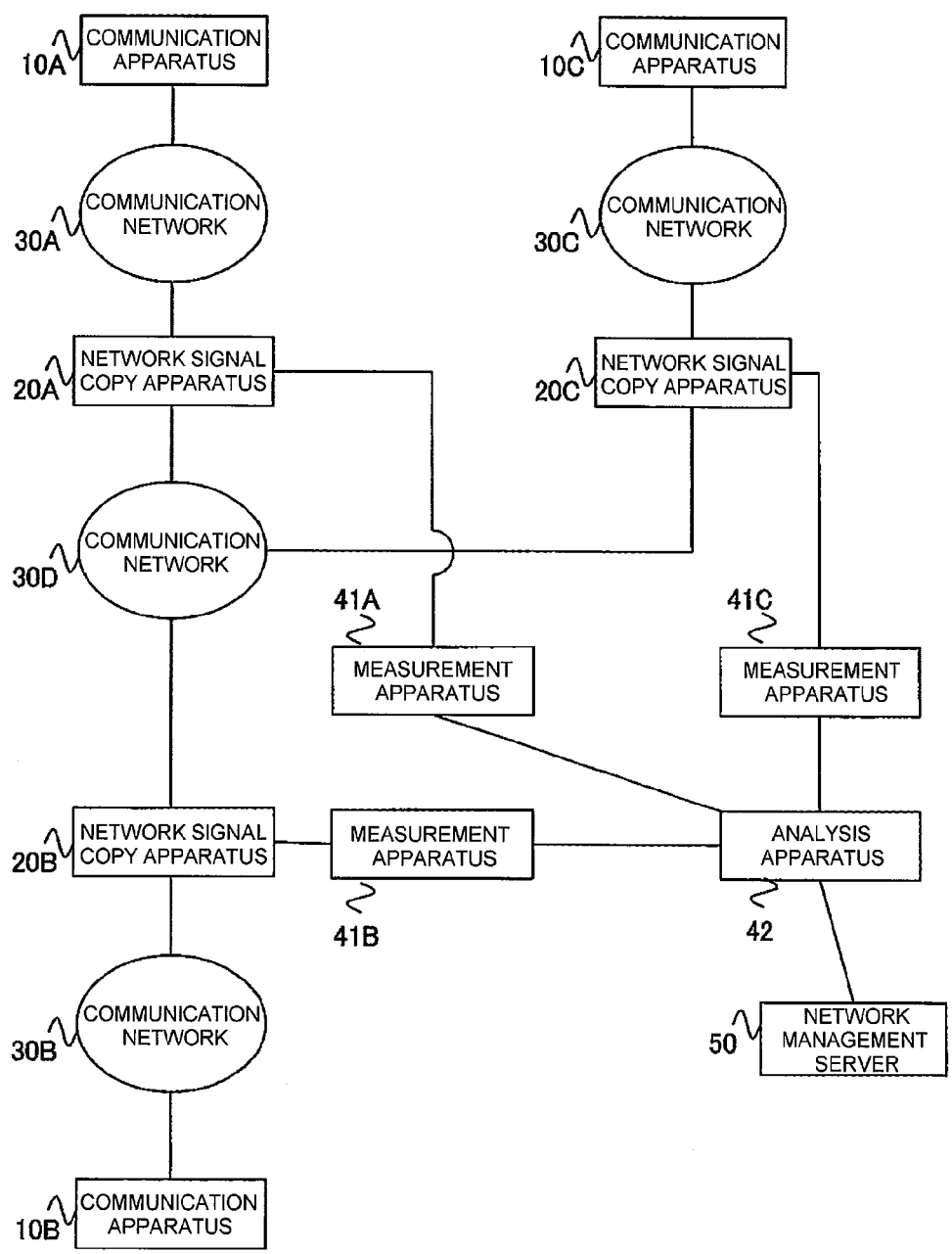
FIG. 11 illustrates an example of the configuration of a network abnormality detection system according to a second embodiment.

As illustrated in a configuration of FIG. 11, a route is configured to be divided into three routes from the boundary of a communication network 30D. At this time, communication statistics information received from a measurement apparatus 41A, communication statistics information received from a measurement apparatus 41B, and communication statistics information received from a measurement apparatus 41C are assumed to be expressed as in the communication statistics tables (for each measurement) 4240A, 4240B, and 4240C, as illustrated in FIGS. 12A to 12C.

Figure 13A:
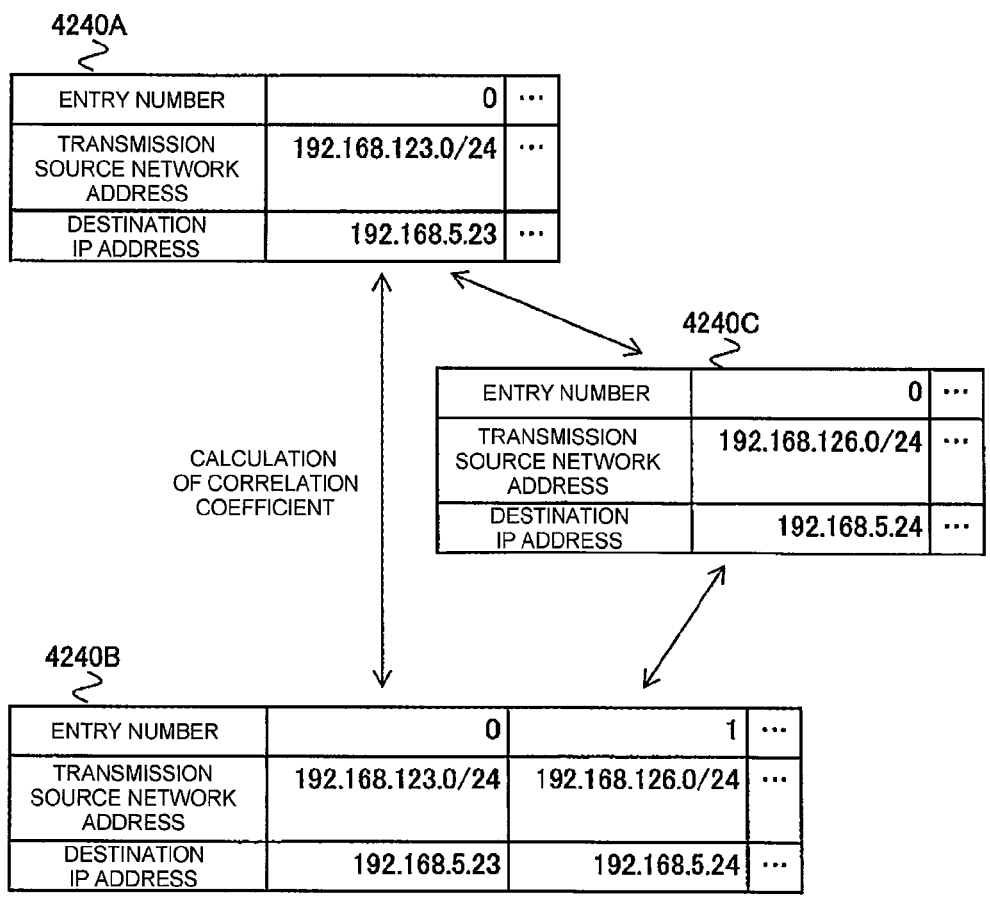
FIG. 13A illustrates the concept of a correlation structure analysis process according to the second embodiment.
Figure 13B:
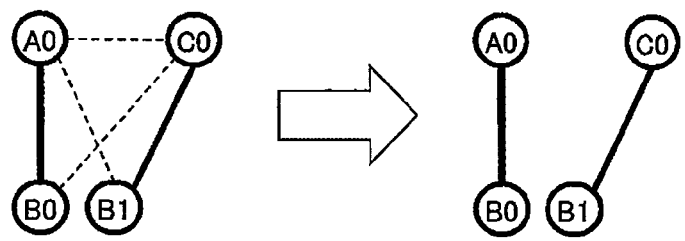
FIG. 13B illustrates an example of the concept of a correlation structure model according to the second embodiment.

At this time, a process in the correlation structure analysis processing unit 422 of the analysis apparatus 42 is illustrated as a conceptual diagram in FIGS. 13A and 13B. As illustrated in FIG. 13A, a correlation coefficient among combinations of the time-series data is calculated using the communication statistics tables (for each measurement apparatus) 4240A to 4240C. As a result, for example, when the correlation structure model of the communication statistics tables (for each measurement apparatus) 4240 is configured such that entry #0 of 4240A and entry #0 of 4240B, and entry #1 of 4240B and entry #0 of 4240C have the strong degree of correlation, that is, are configured to have a correlation, as illustrated in FIG. 13B, occurrence of communication abnormality is detected by applying the abnormality detection process performed by the abnormality detection processing unit 423 of the analysis apparatus 42 to the combination of the time-series data of the communication statistics information indicated in the correlation structure model and by detecting occurrence of abnormality.

Although the present disclosure has been described with reference to example embodiments, those skilled in the art will recognize that various changes and modifications may be made in form and detail without departing from the spirit and scope of the claimed subject matter.

What is claimed is:

1. A network abnormality detection system detecting an abnormality of communication in a communication system in which a plurality of communication apparatuses perform the communication via a communication network, the network abnormality detection system comprising:
   one or more network signal copy apparatuses which each copy one or more packets transmitted at a respective predetermined measurement position in the communication network, and transmit the one or more copied packets;
   one or more measurement which each receive the copied packets from the one or more respective network signal copy apparatuses, and which each include a respective processor connected to a respective storage device which stores instructions that, when executed by the respective processor, cause the respective processor to:
   analyze information regarding the copied packets received from each of the one or more respective network signal copy apparatuses,
   store information regarding an analysis result of the analyzed information as packet count information,
   calculate communication statistics calculation conditions by analyzing the packet count information,
   extract information satisfying the communication statistics calculation from the packet count information and store the extracted information from the packet count information as communication statistics information, and
   transmit the extracted communication statistics information; and
   an analysis apparatus which receives the communication statistics information transmitted from the one or more measurement apparatuses, and includes a processor connected to a storage device which stores instructions that, when executed by the processor, cause the processor to:
   manage the communication statistics information received from the one or more measurement apparatuses as time-series information,
   calculate a correlation coefficient indicating of a correlation between time series of two kinds of the communication statistics information received from the one or more measurement apparatuses;
   check whether the value of the calculated correlation coefficient is equal to or greater than a first predetermined threshold value and create a correlation structure model,
   when the correlation coefficient indicating, the strength of the correlation between the time series of the two kinds of communication statistics information is equal to or greater than a first predetermined threshold value, calculate a value indicating of abnormality between time series of the two kinds of the communication statistics information in the correlation structure model, and detect that the abnormality of the communication occurs when value indicating the degree of abnormality is equal to or greater than a predetermined threshold value.

2. The network abnormality detection system according to claim 1,
   wherein the respective storage device of each of the one or more measurement apparatuses further stores instructions that, when executed by the respective processor, cause the respective processor to:
   store the packet count information in a packet counter table,
   store the communication statistics calculation conditions in a communication statistics calculation condition table, and
   store the communication statistics information in a communication statistics table,
   wherein the packet counter table includes a region storing header information and a region storing packet count information of each of the copied packets,
   wherein, in analyzing the information regarding the copied packets received from each of the one or more network signal copy apparatuses, the respective storage device of each of the one or more measurement apparatuses further stores instructions that, when executed by the respective processor, cause the respective processor to:
   analyze the header information of one of the copied packets,
   examine whether there is an entry identical with the header information of the one of the copied packets stored in the packet counter table, using the header information of the one of the copied packets as a retrieval condition,
   when there is no identical entry, create a new entry and store the header information of the one of the copied packets in the region storing the header information,
   when there is the identical entry or a new entry is created, increase a value of the packet count information of the entry of the one of the copied packets, and
   read and analyze the stored packet count information and compute the communication statistics calculation conditions at each respective predetermined measurement position, and
   wherein, in extracting the information satisfying the communication statistics calculation condition, the respective storage device of each of the one or more measurement apparatuses further stores instructions that, when executed by the respective processor, cause the respective processor to:
   read the communication statistics calculation conditions from the communication statistics calculation condition table,
   retrieve the header information of the packet counter table, using the communication statistics calculation conditions as a retrieval condition,
   read identical entry information and add information regarding the packet count information of the read entry information, and
   write the added information to the communication statistics table.

3. The network abnormality detection system according to claim 2,
   wherein the respective storage device of each of the one or more measurement apparatuses further stores instructions that, when executed by the respective processor, cause the respective processor to:
store a counter table of each header information configured to store packet count information for each value of respective header information in the packet counter table, and
wherein, in calculating the communication statistics calculation condition, the respective storage device of each of the one or more measurement apparatuses further stores instructions that, when executed by the respective processor, cause the respective processor to:
read the entry information included in the packet counter table,
retrieve the header information stored in the packet counter table using the header information of the entry information as a retrieval condition, examine whether there is an entry identical with other entries, and add values of the packet count information of the identical entries, including the self-entry,
store the added packet count information for each header information in the counter table of each header information,
sort the entries from the larger values of the packet count information stored in the counter table of each header information and extract header information of the entries within a predetermined high-order number, and
set the extracted high-order header information in the communication statistics calculation condition table.

4. The network abnormality detection system according to claim 3,
wherein, in calculating the communication statistics calculation condition, the respective storage device of each of the one or more measurement apparatuses further stores instructions that, when executed by the respective processor, cause the respective processor to:
include a counter table of each IP address as the counter table of each header information,
read the entry information included in the packet counter table,
retrieve transmission source IP addresses and destination IP addresses stored in the packet counter table using transmission source IP addresses and destination IP addresses included in the entry information as retrieval conditions, examine whether there are entries identical with other entries, and add values of the packet counter information of the identical entries,
store the added packet count information for each IP address in the counter table of each IP address,
sort the entries from the larger values of the packet count information stored in the counter table of each IP address and extract IP addresses of the entries within a predetermined high-order number, and
set the extracted high-order IP addresses in the communication statistics calculation condition table.

5. The network abnormality detection system according to claim 3,
wherein, in calculating the communication statistics calculation condition, the respective storage device of each of the one or more measurement apparatuses further stores instructions that, when executed by the respective processor, cause the respective processor to:
include a counter table of each port number as the counter table of each header information,
read the entry information included in the packet counter table,
count transmission source port numbers and destination port numbers included in the read packet count information according to each port number,
extract port numbers of a predetermined high-order number of counter values for each port number,
retrieve transmission source port numbers and destination port numbers stored in the packet counter table using transmission source port numbers and destination port numbers included in the entry information as retrieval conditions, examine whether there are entries identical with other entries, and add values of the packet counter information of the identical entries,
store the added packet count information for each port number in the counter table of each port number,
sort the entries from the larger values of the packet count information stored in the counter table of each port number and extract port numbers of the entries within a predetermined high-order number, and
set the extracted high-order port numbers in the communication statistics calculation condition table.

6. The network abnormality detection system according to claim 1,
wherein, in extracting the information satisfying the communication statistics calculation conditions from the packet count information and storing the extracted information as the communication statistics information, the respective storage device of each of the one or more measurement apparatuses further stores instructions that, when executed by the respective processor, cause the respective processor to:
store a measurement date of extracting the information satisfying the communication statistics calculation conditions in the communication statistics information, and
transmit the measurement date and the communication statistics information as a pair of information when transmitting the communication statistics information to the analysis apparatus,
wherein the storage device of the analysis apparatus further stores instructions that, when executed by the processor of the analysis apparatus, cause the processor of the analysis apparatus to:
store header information and a plurality of pairs of the packet count information and the measurement dates received from the one or more measurement apparatuses in a communication statistics table.

7. The network abnormality detection system according to claim 1,
wherein the respective storage device of each of the one or more measurement apparatuses further stores instructions that, when executed by the respective processor, cause the respective processor to:
repeatedly calculate the communication statistics calculation condition, when triggered by a timer event, and
update the stored communication statistics calculation conditions using the calculation result.

8. The network abnormality detection system according to claim 1,
wherein the storage device of the analysis apparatus further stores instructions that, when executed by the processor of the analysis apparatus, cause the processor of the analysis apparatus to:

notify a network management server of the occurrence of the abnormality of the communication when the occurrence of the abnormality of the communication is detected.

* * * * *